(12) United States Patent
Thornes

(10) Patent No.: US 9,778,108 B2
(45) Date of Patent: Oct. 3, 2017

(54) METROLOGY SYSTEM AND METHOD HAVING A PLURALITY OF SENSORS FOR ESTIMATING A SPECTRAL FEATURE OF A PULSED LIGHT BEAM

(71) Applicant: Cymer, LLC, San Diego, CA (US)

(72) Inventor: Joshua Thornes, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 0 days.

(21) Appl. No.: 14/720,207

(22) Filed: May 22, 2015

(65) Prior Publication Data

US 2016/0341602 A1 Nov. 24, 2016

(51) Int. Cl.
*G01J 3/28* (2006.01)
*G01J 3/26* (2006.01)
(Continued)

(52) U.S. Cl.
CPC .............. *G01J 3/26* (2013.01); *G01J 3/027* (2013.01); *G01J 3/18* (2013.01); *G01J 3/2803* (2013.01); *G01J 9/00* (2013.01)

(58) Field of Classification Search
CPC ........ G01J 3/45; G01J 3/26; G01J 2003/2813; G01J 2003/2806
See application file for complete search history.

(56) References Cited

U.S. PATENT DOCUMENTS 4,170,416 A * 10/1979 Fencil ................... G01J 9/0246
356/454

4,309,108 A * 1/1982 Siebert ................. G01J 9/0246
356/519

(Continued)

FOREIGN PATENT DOCUMENTS

CN  202158903 U  3/2012
TW  201344164 A  11/2013

(Continued)

OTHER PUBLICATIONS

International Search Report and Written Opinion, counterpart PCT Application No. PCT/US16/32214, dated Aug. 16, 2016, 15 pages total.

(Continued)

*Primary Examiner* — Hwa Lee
(74) *Attorney, Agent, or Firm* — DiBerardino McGovern IP Group LLC

(57) ABSTRACT

A metrology system includes an optical frequency separation apparatus in the path of the pulsed light beam and configured to interact with the pulsed light beam and output a plurality of spatial components that correspond to the spectral components of the pulsed light beam; a plurality of sensing regions that receive and sense the output spatial components; and a control system connected to an output of each sensing region. The control system is configured to: measure, for each sensing region output, a property of the output spatial components from the optical frequency separation apparatus for one or more pulses; analyze the measured properties including averaging the measured properties to calculate an estimate of the spectral feature of the pulsed light beam; and determine whether the estimated spectral feature of the pulsed light beam is within an acceptable range of values of spectral features.

29 Claims, 9 Drawing Sheets

(51) Int. Cl.
    *G01J 3/18*     (2006.01)
    *G01J 9/00*     (2006.01)
    *G01J 3/02*     (2006.01)

(56)            References Cited

U.S. PATENT DOCUMENTS

| | | | | |
|---|---|---|---|---|
| 4,536,089 | A * | 8/1985 | Siebert | G01J 9/02 |
| | | | | 356/519 |
| 4,822,998 | A * | 4/1989 | Yokota | G01J 3/26 |
| | | | | 250/226 |
| 5,025,445 | A | 6/1991 | Anderson et al. | |
| 5,151,585 | A * | 9/1992 | Siebert | G01J 9/02 |
| | | | | 250/201.9 |
| 5,550,373 | A * | 8/1996 | Cole | G01J 3/02 |
| | | | | 250/338.1 |
| 6,137,821 | A * | 10/2000 | Ershov | G03F 7/70025 |
| | | | | 372/100 |
| 6,509,970 | B1 * | 1/2003 | Seki | G01J 9/0246 |
| | | | | 356/454 |
| 6,539,046 | B2 | 3/2003 | Newman | |
| 6,542,243 | B2 * | 4/2003 | Kramer | H01S 3/08036 |
| | | | | 356/239.2 |
| 6,795,188 | B2 | 9/2004 | Ruck | |
| 6,952,267 | B2 | 10/2005 | Rafac | |
| 7,088,758 | B2 | 8/2006 | Sandstrom et al. | |
| 7,304,748 | B2 | 12/2007 | Rafac | |
| 8,351,473 | B1 * | 1/2013 | Darcie | H01S 5/0687 |
| | | | | 372/20 |
| 2003/0035119 | A1 * | 2/2003 | Myatt | G01J 9/0246 |
| | | | | 356/519 |
| 2003/0107746 | A1 * | 6/2003 | Hedin | G01J 9/0246 |
| | | | | 356/519 |
| 2004/0263844 | A1 * | 12/2004 | Rafac | G01J 1/4257 |
| | | | | 356/326 |
| 2008/0253408 | A1 | 10/2008 | Ishihara | |
| 2008/0253413 | A1 | 10/2008 | Partlo | |
| 2009/0073451 | A1 * | 3/2009 | TeKolste | G01J 3/18 |
| | | | | 356/454 |
| 2012/0162657 | A1 | 6/2012 | Rafac | |
| 2013/0130428 | A1 * | 5/2013 | TeKolste | G01J 3/18 |
| | | | | 438/70 |
| 2014/0104614 | A1 * | 4/2014 | Rokitski | G01J 3/1809 |
| | | | | 356/402 |

FOREIGN PATENT DOCUMENTS

| | | |
|---|---|---|
| WO | 0148881 | 7/2001 |
| WO | 03107494 | 12/2003 |
| WO | 2005008295 | 1/2005 |
| WO | 2013162850 A1 | 10/2013 |

OTHER PUBLICATIONS

Armen Kroyan et al., "Effects of 95% Integral vs. FWHM Bandwidth Specifications on Lithographic Imaging," Optical Microlithography XIV, Christopher J. Progler, Editor, Proceedings of SPIE vol. 4346 (2001), pp. 1244-1253.

Robert J. Rafac, "Overcoming Limitations of Etalon Spectrometers Used for Spectral Metrology of DUV Excimer Light Sources," Optical Microlithography XVII, edited by Bruce W. Smith, Proceedings of SPIE vol. 5377 (2004), pp. 846-856.

Wayne J. Dunstan et al., "Active Spectral Control of DUV Light Sources for OPE Minimization," Optical Microlithography XIX, edited by Donis G. Flagello, Proceedings of SPIE vol. 6154 (2006), 9 pages.

Office Action, counterpart Taiwanese Patent Application No. 105114464, dated Mar. 14, 2017, 17 pages total (including English translation of 7 pages).

* cited by examiner

METROLOGY SYSTEM AND METHOD HAVING A PLURALITY OF SENSORS FOR ESTIMATING A SPECTRAL FEATURE OF A PULSED LIGHT BEAM

TECHNICAL FIELD

The disclosed subject matter relates to estimating a spectral feature such as a bandwidth of a light beam output from an optical source that supplies light to a lithography exposure apparatus.

BACKGROUND

An accurate knowledge of spectral features or properties (for example, a bandwidth) of a light beam output from an optical source such as a laser is important in many scientific and industrial applications. For example, accurate knowledge of the optical source bandwidth is used to enable control of a minimum feature size or critical dimension (CD) in deep ultraviolet (DUV) optical lithography. The critical dimension is the feature size that is printed on a semiconductor substrate (also referred to as a wafer) and therefore the CD can require fine size control. In optical lithography, the substrate is irradiated by a light beam produced by an optical source. Often, the optical source is a laser source and the light beam is a laser beam.

SUMMARY

In some general aspects, a metrology system is used for measuring a spectral feature of a pulsed light beam. The metrology system includes an optical frequency separation apparatus in the path of the pulsed light beam and configured to interact with the pulsed light beam and output a plurality of spatial components that correspond to the spectral components of the pulsed light beam; a plurality of sensing regions that receive and sense the output spatial components; and a control system connected to an output of each sensing region. The control system is configured to: measure, for each sensing region output, a property of the output spatial components from the optical frequency separation apparatus for one or more pulses; analyze the measured properties including averaging the measured properties to calculate an estimate of the spectral feature of the pulsed light beam; and determine whether the estimated spectral feature of the pulsed light beam is within an acceptable range of values of spectral features.

Implementations can include one or more of the following features. For example, the optical frequency separation apparatus can include a plurality of optical frequency separation devices. The metrology system can include a beam separation device that divides the pulsed light beam into a plurality of pulsed light beams, each of the divided pulsed light beams being directed to a respective optical frequency separation device. Each optical frequency separation device can include an etalon. Each sensing region of the plurality of sensing regions can be formed on a distinct sensor placed at the output of one of the optical frequency separation devices. Each optical frequency separation device can have the same response function as the other optical frequency separation devices.

The optical frequency separation apparatus can include one or more etalons.

The metrology system can include a beam separation device in the path between a source that produces the light beam and a photolithography exposure apparatus. The beam separation device can direct a first percentage of the light beam toward the optical frequency separation apparatus, and direct a second percentage of the light beam along the path toward the photolithography exposure apparatus.

The light beam can have a plurality of wavelengths, at least some being in the deep ultraviolet range.

Each sensing region can have the same performance parameters as the other sensing regions of the plurality.

The spectral feature can be a bandwidth of the pulsed light beam.

The metrology system can include a spectral feature selection system optically connected to the pulsed light beam. The control system can be connected to the spectral feature selection system; and, if the control system determines that the estimated spectral feature of the pulsed light beam is outside the acceptable range, then the control system can be configured to send an adjustment signal to the spectral feature selection system to modify the spectral feature of the pulsed light beam.

The range of one or more pulses can be a single pulse.

The measured properties can be averaged by determining which measured property is the most accurate representation of the spectral feature and calculating the spectral feature of the pulsed light beam comprises selecting the measured property that most accurately represents the spectral feature.

The control system can be configured to determine which of the measured properties fall inside a target range of values, and the control system can average the measured properties to calculate an estimate by averaging only those measured properties that fall inside the target range of values.

The measured properties can be averaged by performing a weighted average of the measured properties and calculating the estimate of the spectral feature of the pulsed light beam comprises selecting the weighted average as the spectral feature estimate.

The optical frequency separation apparatus can include a single optical frequency separation device, and the plurality of sensing regions can be formed on a single two-dimensional sensor that receives one or more entire spectral components.

Each sensing region of the plurality of sensing regions can have a sensing axis that is perpendicular to an optical axis of the outputted spatial components.

Each sensing region of the plurality of sensing regions can be formed at a distinct location of a single sensor placed at the output of the optical frequency separation apparatus.

In other general aspects, a method is performed for measuring a spectral feature of a pulsed light beam. The method includes: interacting the pulsed light beam with an optical frequency separation apparatus that outputs a plurality of spatial components that correspond to the spectral components of the pulsed light beam; sensing the plurality of spatial components at each of a plurality of sensing regions placed in the path of the output spatial components; measuring, at each of the sensing regions, a property of the output spatial components for one or more pulses of the pulsed light beam; analyzing the measured properties including averaging the measured properties to calculate an estimate of the spectral feature of the pulsed light beam; and determining whether the estimated spectral feature of the pulsed light beam is within an acceptable range of spectral features.

Implementations can include one or more of the following features. For example, the plurality of spatial components can be sensed at each of the plurality of sensing regions by sensing the plurality of spatial components at each of the plurality of sensing regions simultaneously for the same pulse of the light beam.

The method can include, if it is determined that the estimated spectral feature of the pulsed light beam is outside the acceptable range, then sending an adjustment signal to a spectral feature selection system to modify the spectral feature of the pulsed light beam.

The measured properties can be averaged by determining which measured property is the most accurate representation of the spectral feature and calculating the spectral feature of the pulsed light beam comprises selecting the measured property that most accurately represents the spectral feature.

The method can include determining which of the measured properties fall inside a standard range of values, wherein averaging the measured properties to calculate an estimate comprises averaging only those measured properties that fall inside the standard range of values.

The measured properties can be averaged by performing a weighted average of the measured properties and calculating the estimate of the spectral feature of the pulsed light beam comprises selecting the weighted average as the spectral feature estimate.

The property of the output spatial components can be measured at each of the sensing regions by measuring the property of the output spatial components for each of the sensing regions using the same measurement technique.

In other general aspects, an optical system includes an optical source including at least one gain medium that produces a pulsed light beam; a beam separation device that directs a first portion of the pulsed light beam along a metrology path and directs a second portion of the pulsed light beam along a lithography path; a metrology system in the metrology path, and a beam delivery system in the lithography path. The metrology system includes: an optical frequency separation apparatus in the path of the pulsed light beam and configured to interact with the pulsed light beam and output a plurality of spatial components that correspond to spectral components of the pulsed light beam; a plurality of sensing regions that receive and sense the output spatial components; and a control system connected to an output of each sensing region in the plurality and configured to measure, for each sensing region output, a property of the output spatial components for one or more pulses of the pulsed light beam; average the measured properties to calculate an estimate of the spectral feature of the pulsed light beam; and determine whether the estimated spectral feature of the pulsed light beam is within an acceptable range of values of spectral features. The beam delivery system receives the pulsed light beam from the optical source and directs the pulsed light beam to a photolithography exposure apparatus.

DESCRIPTION

Figure 1:
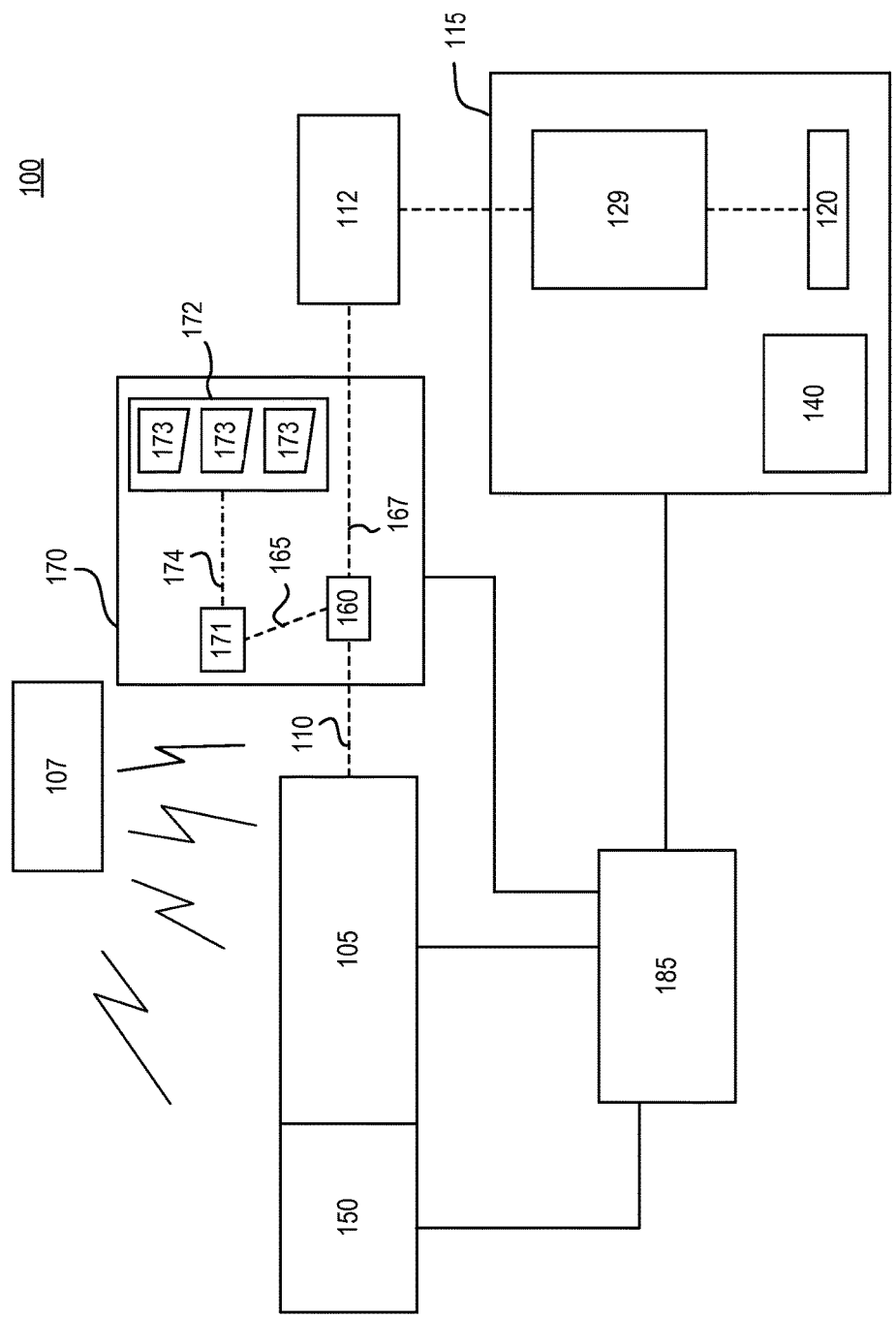
FIG. 1 is a block diagram of a photolithography system including a metrology system for measuring a spectral feature of a pulsed light beam.

Referring to FIG. 1, a photolithography system 100 that includes a pulsed light beam 110 is produced by an optical source 105 and directed to a lithography exposure apparatus 115 that patterns microelectronic features on a wafer 120. The light beam 110 is also directed through a beam preparation system 112, which can include optical elements that modify aspects of the light beam 110. For example, the beam preparation system 112 can include reflective or refractive optical elements, optical pulse stretchers, and optical apertures (including automated shutters).

Figure 2:
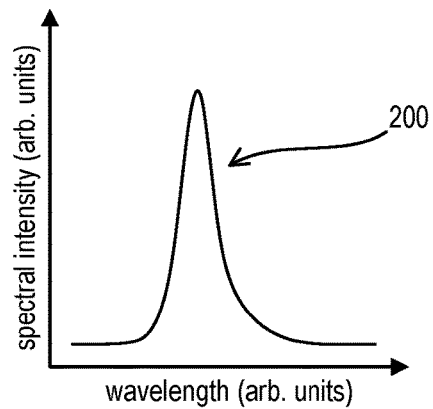
FIG. 2 is a graph of an exemplary optical spectrum of the pulsed light beam.

The photolithography system 100 uses a light beam 110 having a wavelength in the deep ultraviolet (DUV) range, for example, with wavelengths of 248 nanometers (nm) or 193 nm. The size of the microelectronic features patterned on the wafer 120 depends on the wavelength of the light beam 110, with a lower wavelength resulting in a smaller minimum size. When the wavelength of the light beam 110 is 248 nm or 193 nm, the minimum size of the microelectronic features can be, for example, 50 nm or less. The bandwidth of the light beam 110 can be the actual, instantaneous bandwidth of its optical spectrum 200 (or emission spectrum), which contains information on how the optical energy or power of the light beam 110 is distributed over different wavelengths, as shown in the example of FIG. 2. Various disturbances 107 (such as temperature gradients, pressure gradients, optical distortions, etc.) act on the optical source 105 and the light beam 110 to modify the spectral properties or features of the light beam 110. Thus, the lithography system 100 includes other components, such as a spectral feature selection system 150, at least one measurement (or metrology) system 170, and a control system 185, that are used to determine the impact of the disturbances 107 on the light beam 110 and to correct for the effect of such disturbances on the light beam 110.

Because of the disturbances 107, the actual spectral feature (such as the bandwidth or the wavelength) of the light beam 110 at the wafer 120 may not correspond to or match with the desired spectral feature. Thus, the actual spectral feature (such as a characteristic bandwidth) of light beam 110 is measured or estimated during operation by estimating a value of a metric from the optical spectrum so that an operator or an automated system (for example, a feedback controller) can use the measured or estimated bandwidth to adjust the properties of the optical source 105 and to adjust the optical spectrum of the light beam 110. The metrology system 170 measures the spectral feature (such as the bandwidth and/or the wavelength) of the light beam 110 based on this optical spectrum. As discussed below, the metrology system 170 includes a plurality of sensors (or sensing regions 173), and the data from each of the sensors is averaged to obtain a value of the spectral feature that is more precise than would be obtained using only a single sensor. In this way, the noise in measuring the spectral feature can be reduced and the spectral feature can be more precisely estimated. For example, for each additional sensor (or sensing region 173) added to the metrology system 170, the random noise contribution to the estimate of the spectral feature is reduced by $\sqrt{d}$, where d is the number of sensors used in the metrology system. By reducing the noise, the signal to noise ratio of the metrology output is improved.

By reducing the noise in the metrology system 170, the performance of the feedback provided back into the photolithography system 100 from the metrology system 170 is improved because the values of the spectral feature are more precisely determined.

The metrology system 170 receives a portion of the light beam 110 that is redirected from a beam separation device 160 that is placed in a path between the optical source 105 and the photolithography exposure apparatus 115. The beam separation device 160 directs a first portion or percentage 165 of the light beam 110 into the metrology system 170 and directs a second portion or percentage 167 of the light beam 110 toward the exposure apparatus 115. In some implementations, the majority of the light beam is directed in the second portion 167 toward the exposure apparatus 115. For example, the beam separation device 160 directs a fraction (for example, 1-2%) of the light beam 110 into the metrology system 170. The beam separation device 160 can be, for example, a beam splitter.

The metrology system 170 includes an optical frequency separation apparatus 171 in the path of the light beam 110 and a plurality 172 of sensing regions 173 at an output of the optical frequency separation apparatus 171.

The optical frequency separation apparatus 171 interacts with the light beam 110 and outputs a plurality of spatial components 174 that correspond to the spectral components of the light beam 110. The spectral components of the light beam 110 are in the optical spectrum of the light beam 110; therefore, they correspond to how the values of the optical energy or power of the light beam 110 are distributed over the different wavelengths. The spatial components 174 correspond to these intensities mapped into a two-dimensional space. Thus, the optical frequency separation apparatus 171 transforms the spectral information (such as the wavelength) of the light beam 110 into spatial information that can be sensed or detected by the sensing regions 173. The transformation maps the spectral information (such as the wavelength) to different positions in space so that the spectral information that can be observed by the sensing regions 173.

Figure 10:
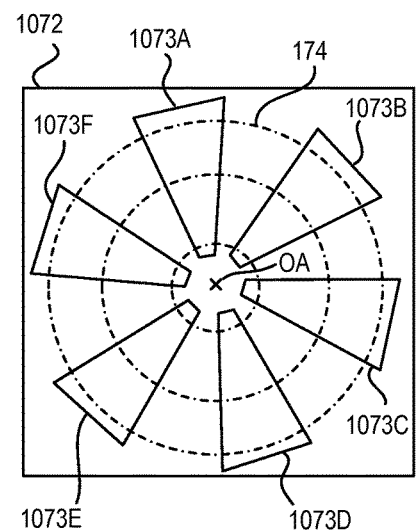

The optical frequency separation apparatus 171 can include one or more optical frequency separation devices. If two or more optical frequency separation devices are utilized (such as shown in FIG. 10), then all of the optical frequency separation devices can be configured to have the same response function. This means that each optical frequency separation device has the same impulse response as the other optical frequency separation devices of the apparatus 171. If two or more optical frequency separation devices are utilized (as shown in the example of FIG. 10), then the metrology system 170 would also include a second beam separation device for dividing the light beam portion 165 into a plurality of light beam portions, each of which is directed to its own optical frequency separation device.

Each of the sensing regions 173 receives and senses the output spatial components 174. Each sensing region 173 can be defined by a linear axis that indicates generally the active area of the sensing region 173. The linear axis of the sensing region can be perpendicular to the direction of propagation of the spatial components 174. The sensing axis of each sensing region 173 can be distinct from the sensing axes of the other sensing regions 173 of the plurality 172. Examples of linear axes are discussed below with reference to specific examples.

Each sensing region 173 can be a detector that receives and senses the output spatial components 174. For example, one type of suitable detector that can be used to measure along one dimension is a linear photodiode array. The linear photodiode array is consists of multiple elements of the same size, formed in a linear arrangement at an equal spacing in one package. The photodiode array is sensitive to light having a wavelength in the deep ultraviolet range, which is the wavelength of the light beam 110. Such a photodiode array can be a 1024 pixel N-channel MOS transistor photodiode array (model S3903-1024Q) from Hamamatsu Photonics K.K. of Japan. In this example, the sensing axis of each linear photodiode array corresponds to the axis of the linear arrangement.

As another example, each sensing region 173 can be a portion of a detector that receives and senses the output spatial components 174. For example, a suitable detector that provides for a plurality of sensing regions 173 is a two dimensional sensor such as a two-dimensional charged coupled device (CCD) or a two-dimensional complementary metal oxide semiconductor (CMOS) sensor. Such sensors can be purchased from, for example, Hamamatsu. The sensor should be able to read out data at a fast enough rate, for example, at about 6 kHz. Each portion of the detector can be arranged along a sensing axis. For example, if the detector is radially symmetric then each sensing axis can be a distinct radial axis.

Each of the sensing regions 173 is configured to have the same performance parameters as the other sensing regions 173 of the plurality 172. In this way, the measurements at the sensing regions 173 can be combined by performing an averaging to reduce the overall random noise in the measurement of the spectral feature. Moreover, all of the sensing regions 173 can be configured to record the output spatial components 174 simultaneously or within a time frame that is acceptable with each other so that the data they are measuring can be combined to estimate the spectral feature for the same pulse of the light beam 110. For example, if the sensing regions 173 are capturing data from a single pulse of the light beam 110, then as long as each of the sensing regions 173 can capture data within the amount of time between the pulses, then the impact is that the data from all of the sensing regions 173 can be combined even if the integration time of the sensing regions 173 is long compared with the temporal length of a pulse. For example, there can be greater than 100 µs between pulses and the temporal length of a pulse can be on the order of tens of nanoseconds (for example, 30 ns). In this example, the integration time can be 10 µs (which is much longer than the temporal length of the pulse but shorter than the time between pulses) so that nanosecond level accuracy is not required of the sensing regions 173. Since the optical design is such that light other than the DUV light beam 110 is not incident on the sensing regions 173, all of the sensing regions 173 can capture the spatial fringe pattern 1311 for each pulse.

The control system 185 is connected to the output of each sensing region 173 as well as the optical source 105 and spectral feature selection system 150. The control system 185 measures, for each output, a property of the spatial components 174, and analyzes these measured properties to calculate an estimate of the spectral feature of the light beam 110. The control system 185 can perform the measurement, analysis, and calculation for each pulse of the light beam 110 or for a set of pulses of the light beam 110.

Before providing details about the metrology system 170, a general description of the photolithography system 100 is provided first for background.

Referring to FIG. 2, the optical spectrum 200 (or emission spectrum) of a pulsed light beam 110 produced by an optical source 105 contains information on how the optical energy or power is distributed over different wavelengths. The optical spectrum 200 of the light beam 110 is depicted in the form of a diagram where the spectral intensity (not necessarily with an absolute calibration) is plotted as a function of the wavelength or optical frequency. The optical spectrum 200 can be referred to as the spectral shape or intensity spectrum of the light beam 110. Spectral properties of the light beam 110 include any aspect or representation of the intensity spectrum. For example, bandwidth is a spectral feature. The bandwidth of the light beam 110 is a measure of the width of this spectral shape, and this width can be given in terms of wavelength or frequency of the laser light. Any suitable mathematical construction (that is, metric) related to the details of the optical spectrum can be used to estimate a value that characterizes the bandwidth of the light beam. For example, the full width of the spectrum at a fraction (X) of the maximum peak intensity of the spectral shape (referred to as FWXM) can be used to characterize the light beam bandwidth. As another example, the width of the spectrum that contains a fraction (Y) of the integrated spectral intensity (referred to as EY) can be used to characterize the light beam bandwidth.

The lithography exposure apparatus 115 includes an optical arrangement that includes an illuminator system 129 having, for example, one or more condenser lenses, a mask, and an objective arrangement. The mask is movable along one or more directions, such as along an optical axis of the light beam 110 or in a plane that is perpendicular to the optical axis. The objective arrangement includes a projection lens and enables the image transfer to occur from the mask to the photoresist on the wafer. The illuminator system adjusts the range of angles for the light beam 110 impinging on the mask. The illuminator system also homogenizes (makes uniform) the intensity distribution of the light beam 110 across the mask. The lithography exposure apparatus 115 can include, among other features, a lithography controller 140, air conditioning devices, and power supplies for the various electrical components. The lithography controller 140 controls how layers are printed on the wafer 120.

The wafer 120 is irradiated by the light beam 110. A process program or recipe determines the length of the exposure on the wafer 120, the mask used, as well as other factors that affect the exposure. During lithography, a plurality of pulses of the light beam 110 illuminates the same area of the wafer 120 to form an illumination dose. The number of pulses N of the light beam 110 that illuminate the same area can be referred to as an exposure window or slit and the size of this slit can be controlled by an exposure slit placed before the mask. In some implementations, the value of N is in the tens, for example, from 10-100 pulses. In other implementations, the value of N is greater than 100 pulses, for example, from 100-500 pulses. One or more of the mask, the objective arrangement, and the wafer 120 can be moved relative to each other during the exposure to scan the exposure window across an exposure field. The exposure field is the area of the wafer 120 that is exposed in one scan of the exposure slit or window.

Figure 3:
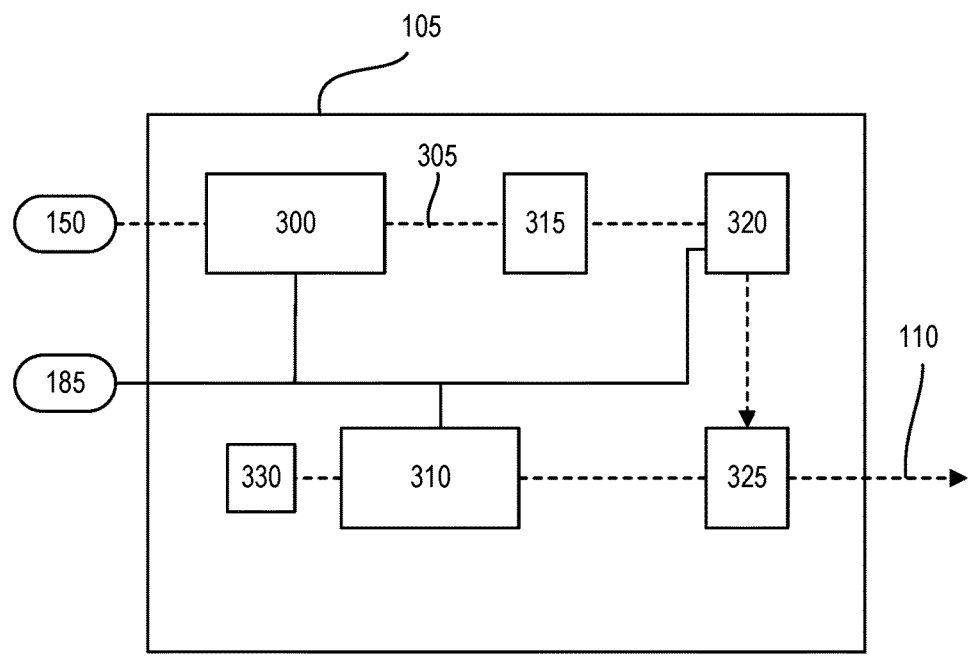
FIG. 3 is a block diagram of an exemplary optical source that can be used in the photolithography system of FIG. 1.

Referring to FIG. 3, an exemplary optical source 105 is a pulsed laser source that produces as the light beam 110 a pulsed laser beam. As shown in the example of FIG. 3, the optical source 105 is a two-stage laser system that includes a master oscillator (MO) 300 that provides a seed light beam 305 to a power amplifier (PA) 310. The master oscillator 300 typically includes a gain medium in which amplification occurs and an optical feedback mechanism such as an optical resonator. The power amplifier 310 typically includes a gain medium in which amplification occurs when seeded with the seed laser beam from the master oscillator 300. If the power amplifier 310 is designed as a regenerative ring resonator then it is described as a power ring amplifier (PRA) and in this case, enough optical feedback can be provided from the ring design. The master oscillator 300 enables fine tuning of spectral parameters such as the center wavelength and the bandwidth at relatively low output pulse energies. The power amplifier 310 receives the output from the master oscillator 300 and amplifies this output to attain the necessary powers for output to use in photolithography.

The master oscillator 300 includes a discharge chamber having two elongated electrodes, a laser gas that serves as the gain medium, a fan for circulating the gas between the electrodes, and a laser resonator is formed between the spectral feature selection system 150 on one side of the discharge chamber and an output coupler 315 on a second side of the discharge chamber. The optical source 105 can also include a line center analysis module (LAM) 320 that receives an output from the output coupler 315, and one or more beam modification optical systems 325 that modify the size and/or shape of the laser beam as needed. The line center analysis module 320 is an example of one type of measurement system that can be used to measure the wavelength (for example, the center wavelength) of the seed light beam 305. The laser gas used in the discharge chamber can be any suitable gas for producing a laser beam around the required wavelengths and bandwidth, for example, the laser gas can be argon fluoride (ArF), which emits light at a wavelength of about 193 nm, or krypton fluoride (KrF), which emits light at a wavelength of about 248 nm.

The power amplifier 310 includes a power amplifier discharge chamber, and if it is a regenerative ring amplifier, the power amplifier also includes a beam reflector 330 that reflects the light beam back into the discharge chamber to form a circulating path. The power amplifier discharge chamber includes a pair of elongated electrodes, a laser gas that serves as the gain medium, and a fan for circulating the gas between the electrodes. The seed light beam 305 is amplified by repeatedly passing through the power amplifier. The beam modification optical system 325 provides a way (for example, a partially-reflecting mirror) to in-couple the seed light beam and to out-couple a portion of the amplified radiation from the power amplifier to form the output light beam 110.

The line center analysis module 320 monitors the wavelength of the output of the master oscillator 300. The line center analysis module can be placed at other locations within the optical source 105, or it can be placed at the output of the optical source 105.

Figure 4:
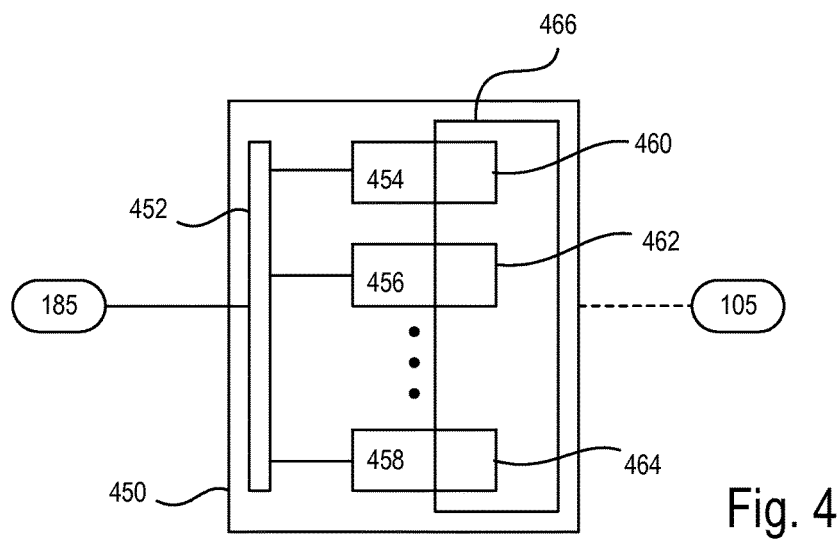
FIG. 4 is a block diagram of an exemplary spectral feature selection system that can be used in the photolithography system of FIG. 1.

Referring again to FIG. 1, the spectral feature selection system 150 receives a light beam from the optical source 105 and finely tunes the spectral output of the optical source 105 based on the input from the control system 185. Referring to FIG. 4, an exemplary spectral feature selection system 450 is shown that couples to light from the optical source 105. In some implementations, the spectral feature selection system 450 receives the light from the master oscillator 300 to enable the fine tuning of the spectral features such as wavelength and bandwidth within the master oscillator 300.

The spectral feature selection system 450 can include a control module such as spectral feature control module 452 that includes electronics in the form of any combination of firmware and software. The module 452 is connected to one or more actuation systems such as spectral feature actuation systems 454, 456, 458. Each of the actuation systems 454, 456, 458 can include one or more actuators that are connected to respective optical features 460, 462, 464 of an optical system 466. The optical features 460, 462, 464 are configured to adjust particular characteristics of the generated light beam 110 to thereby adjust the spectral feature of the light beam 110. The control module 452 receives a control signal from the control system 185, the control signal including specific commands to operate or control one or more of the actuation systems 454, 456, 458. The actuation systems 454, 456, 458 can be selected and designed to work together, that is, in tandem. Moreover, each of the actuation systems 454, 456, 458 can be optimized to respond to a particular class of disturbances 107.

Together, such coordination and cooperation can be employed by the control system 185 to hold or maintain one or more spectral features (such as the wavelength or bandwidth) at a desired setpoint or at least within a desired range around a setpoint, even though the optical source 105 may be subjected to a wide array of disturbances 107.

Figure 5:
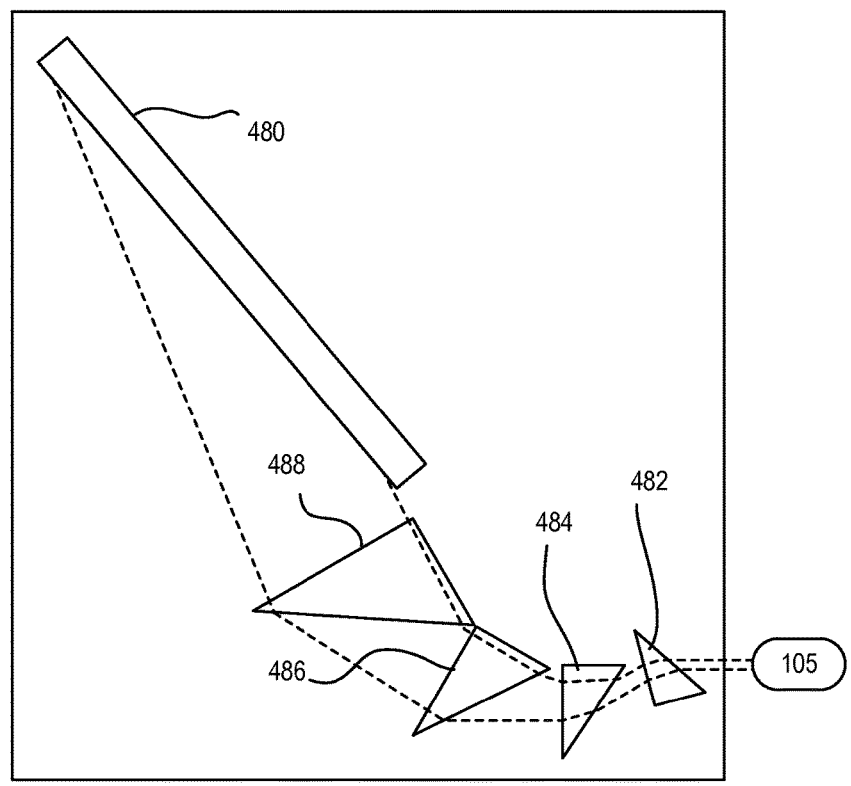
FIG. 5 is a block diagram of an exemplary line narrowing module that can be used in the spectral feature selection system of FIG. 4.

Each optical feature 460, 462, 464 is optically coupled to the light beam 110 produced by the optical source 105. In some implementations, the optical system 466 is a line narrowing module such as that shown in FIG. 5. The line narrowing module includes as the optical features 460, 462, 464 dispersive optical elements such as reflective gratings 480 and refractive optical elements such as prisms 482, 484, 486, 488, one or more of which can be rotatable. An example of this line narrowing module can be found in U.S. application Ser. No. 12/605,306, entitled "System Method and Apparatus for Selecting and Controlling Light Source Bandwidth," and filed on Oct. 23, 2009 (the '306 application). In the '306 application, a line narrowing module is described that includes a beam expander (including the one or more prisms 482, 484, 486, 488) and the dispersive element such as the grating 480. The respective actuation systems for the actuatable optical features such as the grating 480, and one or more of the prisms 482, 484, 486, 488 are not shown in FIG. 5.

Each of the actuators of the actuation systems 454, 456, 458 is a mechanical device for moving or controlling the respective optical features 460, 462, 464 of the optical system 466. The actuators receive energy from the module 452, and convert that energy into some kind of motion imparted to the optical features 460, 462, 464 of the optical system. For example, in the '306 application, actuation systems are described such as force devices (to apply forces to regions of the grating) and rotation stages for rotating one or more of the prisms of the beam expander. The actuation systems 454, 456, 458 can include, for example, motors such as stepper motors, valves, pressure-controlled devices, piezoelectric devices, linear motors, hydraulic actuators, voice coils, etc.

Figure 6:
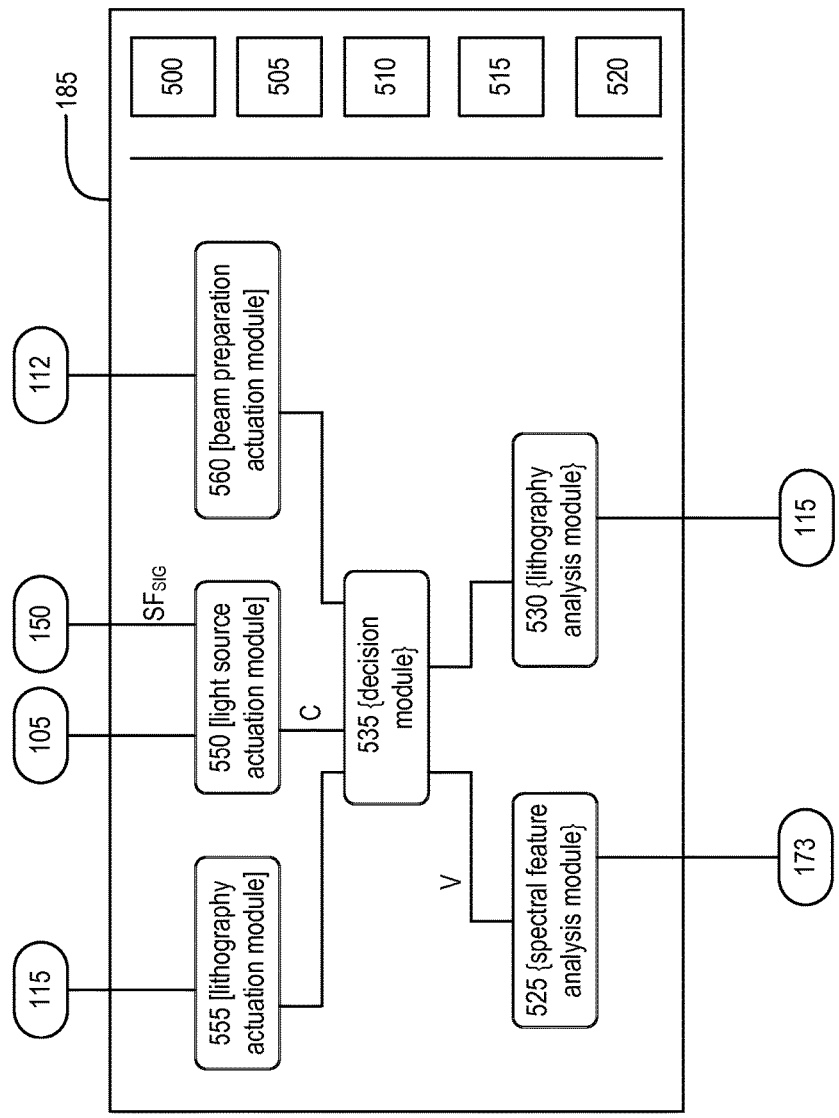
FIG. 6 is a block diagram of an exemplary control system of the photolithography system of FIG. 1.

Referring to FIG. 6, details about the control system 185 are provided that relate to the aspects of the system and method described herein. The control system 185 can include other features not shown in FIG. 6. In general, the control system 185 includes one or more of digital electronic circuitry, computer hardware, firmware, and software.

The control system 185 includes memory 500, which can be read-only memory and/or random access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks. The control system 185 can also include one or more input devices 505 (such as a keyboard, touch screen, microphone, mouse, hand-held input device, etc.) and one or more output devices 510 (such as a speaker or a monitor).

The control system 185 includes one or more programmable processors 515, and one or more computer program products 520 tangibly embodied in a machine-readable storage device for execution by a programmable processor (such as the processors 515). The one or more programmable processors 515 can each execute a program of instructions to perform desired functions by operating on input data and generating appropriate output. Generally, the processor 515 receives instructions and data from memory 500. Any of the foregoing may be supplemented by, or incorporated in, specially designed ASICs (application-specific integrated circuits).

The control system 185 includes a spectral feature analysis module 525, a lithography analysis module 530, a decision module 535, a light source actuation module 550, a lithography actuation module 555, and a beam preparation actuation module 560. Each of these modules can be a set of computer program products executed by one or more processors such as the processors 515. The spectral feature analysis module 525 receives the output from each of the sensing regions 173 of the metrology system 170. The lithography analysis module 530 receives information from the lithography controller 140 of the lithography exposure apparatus 115. The decision module 535 receives the outputs from the analyses modules (such as the modules 525 and 530) and determines which actuation module or modules need to be activated based on the outputs from the analyses modules. The light source actuation module 550 is connected to one or more of the optical source 105 and the spectral feature selection system 150. The lithography actuation module 555 is connected to the lithography exposure apparatus 115, and specifically to the lithography controller 140. The beam preparation actuation module 560 is connected to one or more components of the beam preparation system 112.

While only a few modules are shown in FIG. 6, it is possible for the control system 185 to include other modules. Additionally, although the control system 185 is represented as a box in which all of the components appear to be co-located, it is possible for the control system 185 to be made up of components that are physically remote from each other. For example, the light source actuation module 550 can be physically co-located with the optical source 105 or the spectral feature selection system 150.

In general, the control system 185 receives at least some information about the light beam 110 from the metrology system 170 (specifically from the sensing regions 173), and the spectral feature analysis module 525 performs an analysis on the information to determine how to adjust one or more spectral features (for example, the bandwidth) of the light beam 110 supplied to the lithography exposure apparatus 115. Based on this determination, the control system 185 sends signals to the spectral feature selection system 150 and/or the optical source 105 to control operation of the optical source 105.

In general, the spectral feature analysis module 525 performs all of the analysis needed to estimate the spectral feature (for example, the bandwidth) of the light beam 110. The output of the spectral feature analysis module 525 is an estimated value of the spectral feature. The spectral feature analysis module 525 includes a measurement block for measuring properties of the output spatial components that are sensed by the sensing regions 173. The spectral feature analysis module 525 includes an averaging block that averages the measured properties to calculate an estimate of the spectral feature of the light beam 110.

The spectral feature analysis module 525 includes a comparison block connected to receive the estimated spectral feature and also connected to receive a spectral feature target value. In general, the comparison block outputs a spectral feature error value that represents a difference between the spectral feature target value and the estimated value. The decision module 535 receives the spectral feature error value and determines how best to effect a correction to the system 100 in order to adjust the spectral feature. Thus, the decision module 535 sends a signal to the light source actuation module 550, which determines how to adjust the spectral feature selection system 150 (or the optical source 105) based on the spectral feature error value. The output of the light source actuation module 550 includes a set of actuator commands that are sent to the spectral feature selection system 150. For example, light source actuation module 550 sends the commands to the spectral feature control module 452, which is connected to the spectral feature actuation systems 454, 456, 458.

Figure 7:
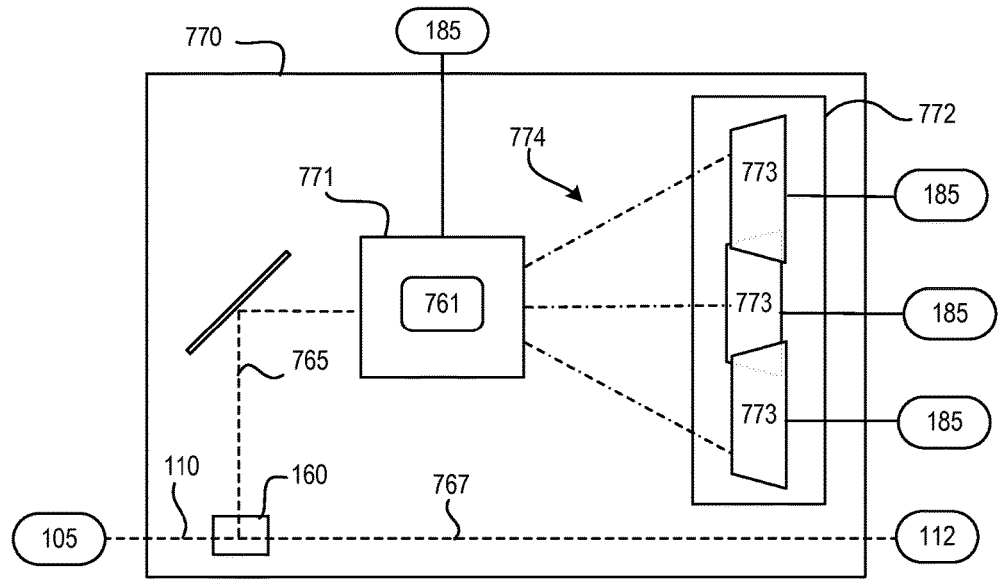
FIG. 7 is a block diagram of an exemplary metrology system of the photolithography system of FIG. 1.

Referring to FIG. 7, an exemplary metrology system 770 is shown in which the optical frequency separation apparatus 771 includes a single optical frequency separation device 761. The optical frequency separation device 761 receives the first portion 765 of the light beam 110 from the beam separation device 160. The optical frequency separation device 761 interacts with the pulsed light beam portion 765 and outputs a plurality of spatial components 774 that correspond to the spectral components of the pulsed light beam portion 765. The metrology system 770 also includes the plurality 772 of sensing regions 773. Each sensing region 773 can correspond to a detector or a part of a detector that is able to sense or detect the spatial components 774, as discussed below with reference to FIGS. 9-12.

Figure 8:
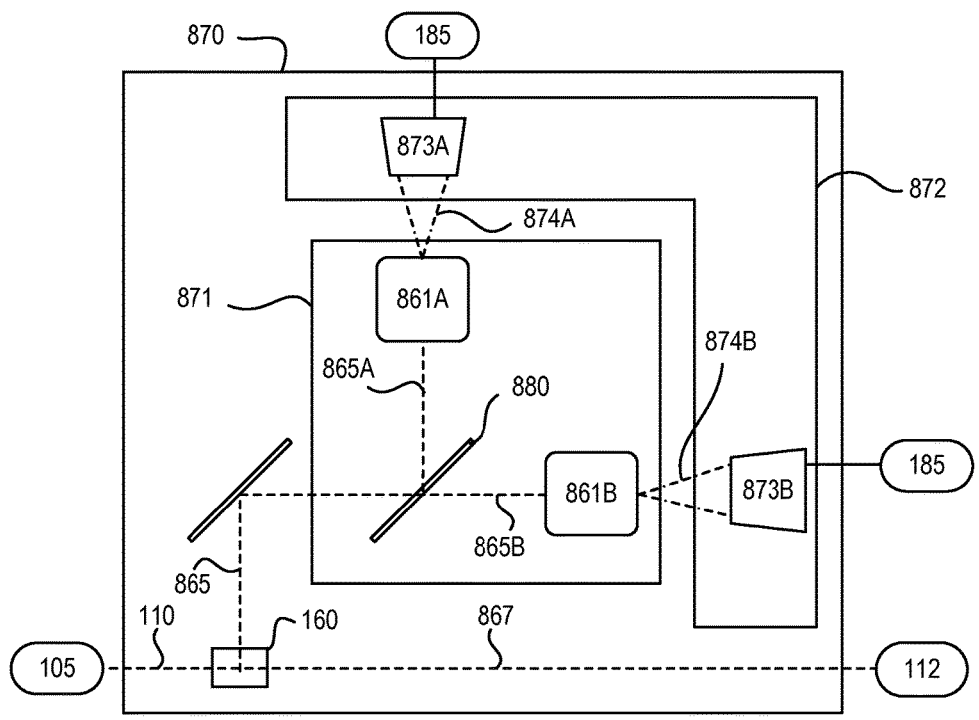
FIG. 8 is a block diagram of an exemplary metrology system of the photolithography system of FIG. 1.

Referring to FIG. 8, another exemplary metrology system 870 is shown in which the optical frequency separation apparatus 871 includes a plurality of optical frequency separation devices 861A, 861B. While two devices 861A, 861B are shown in FIG. 8, it is possible that more than two optical frequency separation devices can be used. Additionally, the metrology system 870 includes the second beam separation device 880 for dividing the light beam portion 865 into a plurality of light beam portions 865A, 865B, each of which is directed to its own respective optical frequency separation device 861A, 861B. All of the optical frequency separation devices 861A, 861B are configured to have the same response function.

The optical frequency separation device 861A receives the light beam portion 865A from the beam separation device 880. The optical frequency separation device 861A interacts with the pulsed light beam portion 865A and outputs spatial components 874A that correspond to the spectral components of the pulsed light beam portion 865A.

The optical frequency separation device 861B receives the light beam portion 865B from the beam separation device 880. The optical frequency separation device 861B interacts with the pulsed light beam portion 865B and outputs spatial components 874B that correspond to the spectral components of the pulsed light beam portion 865B.

The metrology system 870 also includes the plurality 872 of sensing regions 873A, 873B. Each sensing region 873A, 873B can correspond to a detector that is able to sense or detect the spatial components 874A, 874B. Thus, for example, each sensing region 873A, 873B can be associated with a single optical frequency separation device 861A, 861B of the optical frequency separation apparatus 871.

Figure 9:
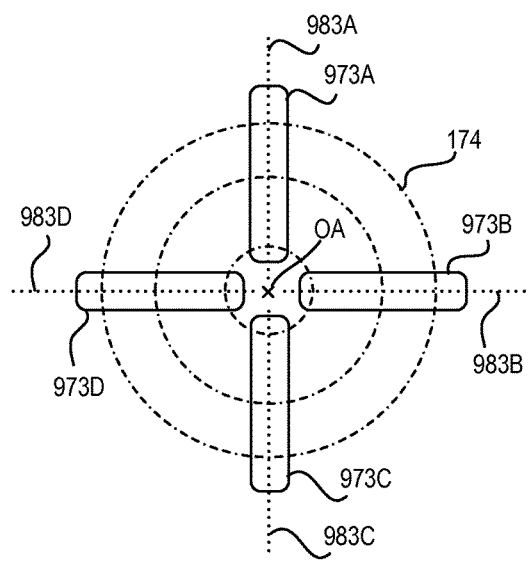
FIGS. 9-12 are block diagrams of exemplary sensing regions that can be used in the metrology system of the photolithography systems of FIGS. 1, 7, and 8.

Referring to FIG. 9, each sensing region 173 (such as sensing regions 773 or sensing regions 873A, 873B) can be configured as a stand-alone detector 973A, 973B, 973C, 973D (for example, a one dimensional linear array of photodiodes) that is configured to interact with only one region of the spatial components 174 (for example, the spatial components 774 or 874A, 874B). In this example, there are four sensing regions 173 (denoted by detectors 973A, 973B, 973C, 973D), but fewer or more than four sensing regions 173 are possible. Each detector 973A, 973B, 973C, 973D is arranged to extend along its respective sensing axis 983A, 983B, 983C, 983D. At least one of the sensing axes is along a distinct direction from the other sensing axes. All of the sensing axes 983A, 983B, 983C, 983D are perpendicular to the optical axis OA of the spatial components 174.

Figure 11:
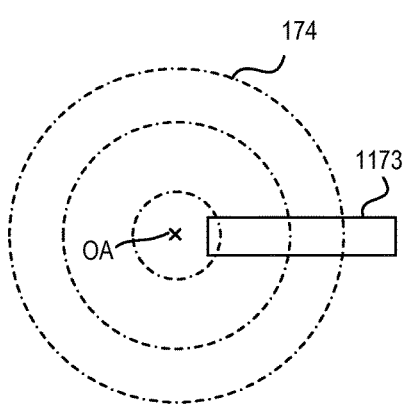

As another example, as shown in FIG. 10, each sensing region 173 (such as sensing regions 773 and 873A, 873B) can be configured as a portion or area (referred to as a region of interest or ROI) 1073A, 1073B, 1073C, 1073D, 1073E, 1073F of a single detector 1072 (for example, a two dimensional array of photodiodes) that is configured to interact with the spatial components 174. In this example, there are six sensing regions 173 (denoted by the areas 1073A, 1073B, 1073C, 1073D, 1073E, 1073F), but fewer or more than six sensing regions 173 are possible. Each of the areas 1073A, 1073B, 1073C, 1073D, 1073E, 1073F is arranged to extend along its respective sensing axis. And, in this particular arrangement, each of the sensing axes is along a direction that is distinct from the other sensing axes. All of the sensing axes are perpendicular to the optical axis OA of the spatial components 174. As another example, as shown in FIG. 11, each sensing region 173 (such as sensing regions 773 or sensing regions 873A, 873B) can be configured as a one dimensional detector 1173, such as a linear array of photodiodes, that is configured to interact with only one region of the spatial components 174.

Figure 12:
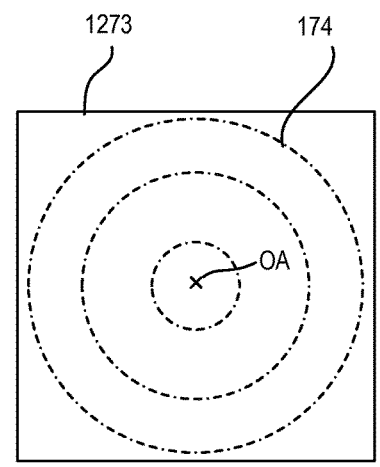

As a further example, as shown in FIG. 12, each sensing region 173 (such as sensing regions 773 or sensing regions 873A, 873B) can be configured as a two dimensional detector 1273, such as a two dimensional array of photodiodes, that is configured to interact with the respective spatial components 174. In this example, each two dimensional detector can interact with the entire range of spatial components 174.

The sensing axes of each of the sensing regions 173 are perpendicular to the optical axis OA of the spatial components 174.

Figure 13:
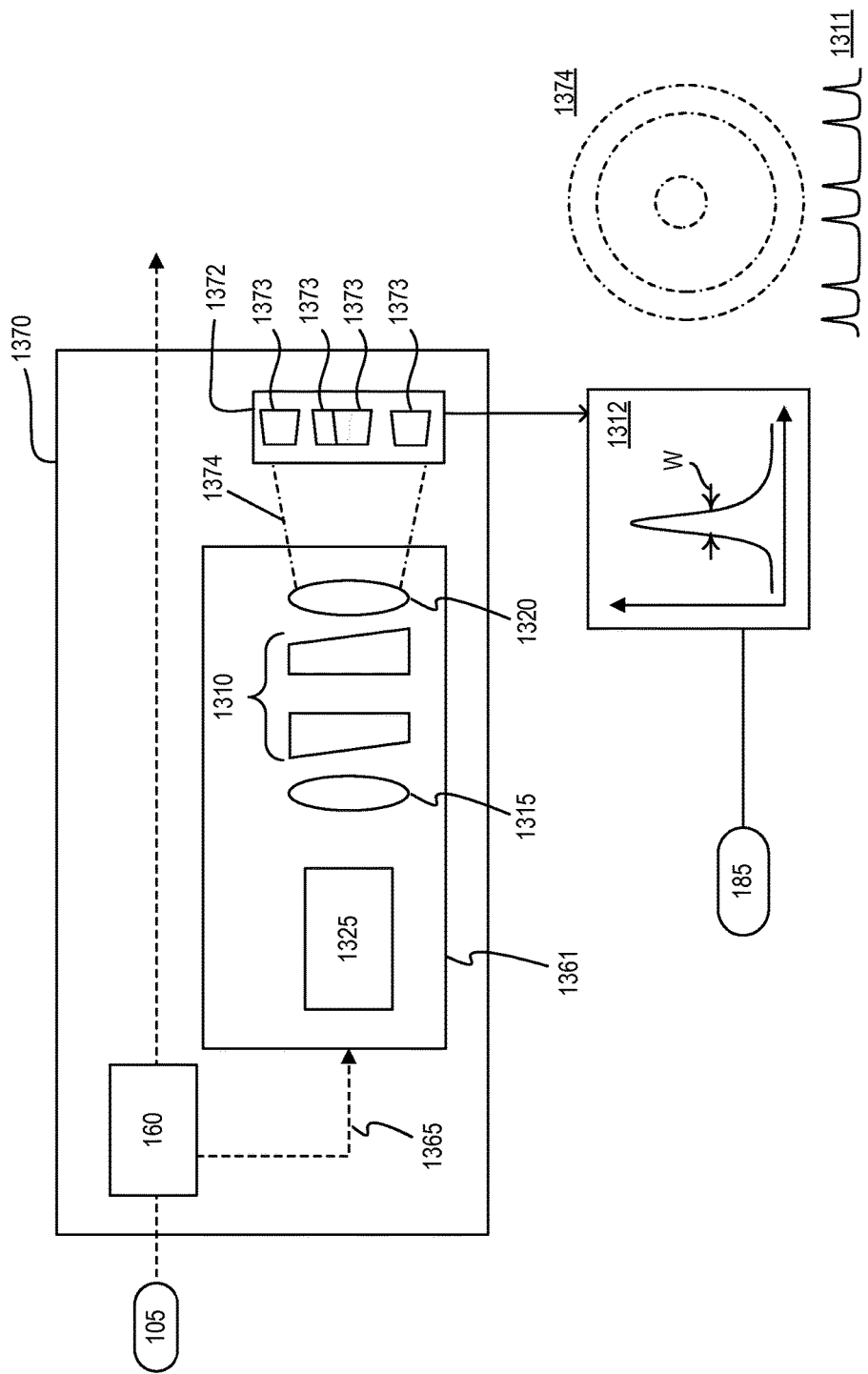
FIG. 13 is a block diagram of an exemplary metrology system that uses an etalon spectrometer.

Referring to FIG. 13, an exemplary metrology system 1370 is shown having as the optical frequency separation apparatus a single optical frequency separation device 1361 that is an etalon optical arrangement that is a part of an etalon spectrometer. The etalon spectrometer includes the etalon optical arrangement 1361 and a plurality 1372 of sensing regions that are at the output of the etalon optical arrangement 1361. The optical arrangement 1361 receives the first portion 1365 of the light beam 110 from the beam separation device 160.

The light beam portion 1365 travels through the optical arrangement 1361, and the plurality 1372 of sensing regions 1373 receives the output light 1374 from the optical arrangement 1371. The output of the plurality 1372 of sensing regions 1373 is connected to the control system 185; in this way, the control system 185 receives the sensed or recorded spatial components from the sensing regions 1373, and performs a method to estimate the spectral feature of the pulsed light beam 110, as discussed in detail below.

The optical arrangement 1361 includes an etalon 1310, lenses 1315, 1320, and optional additional optics 1325 such as an illuminator that includes a homogenizer (for example, a stationary, moving, or rotating diffuser) that homogenizes the beam. The illuminator can also generate a diverging beam where any part of the original beam is spread into the same range of angles equally. In some implementations, the etalon 1310 includes a pair of partially reflective glass or optical flats (as shown in FIG. 13), which can be spaced a short distance (for example, millimeters to centimeters) apart, with the reflective surfaces facing each other. In other implementations, the etalon 1310 includes a single plate with two parallel reflecting surfaces. The flats can be made in a wedge shape (which is shown in FIG. 13) to prevent the rear surfaces from producing interference fringes; the rear surfaces often also have an anti-reflective coating. As the light beam portion 1365 passes through the paired flats, it is multiply reflected, and produces a plurality of transmitted rays, which are collected by the lens 1320 and brought to the plurality 1372 of sensing regions.

A single etalon 1310 (and optical arrangement 1361) produces as the spatial components 1374 an interference pattern that takes the appearance of a set of concentric rings if the light beam portion 1365 is a diverging or a converging beam. The interference pattern takes the appearance of a more uniform intensity distribution if the light beam portion 1365 is a collimated beam. In particular, the sharpness of the rings depends on the reflectivity of the flats of the etalon 1310; thus, if the reflectivity is high, resulting in a high Q factor, monochromatic light produces a set of narrow bright rings against a dark background. The transmission of the etalon 1310 as a function of wavelength is shown in the resulting fringe pattern 1311, which produces the optical spectrum 1312 that is directed to the control system 185.

While the complete interference pattern is shown, it is not needed to perform the calculations or estimates; it is alternatively possible to generate only fringes within a region that is slightly larger than an active area of each of the sensing regions of the plurality 1372.

Figure 14:
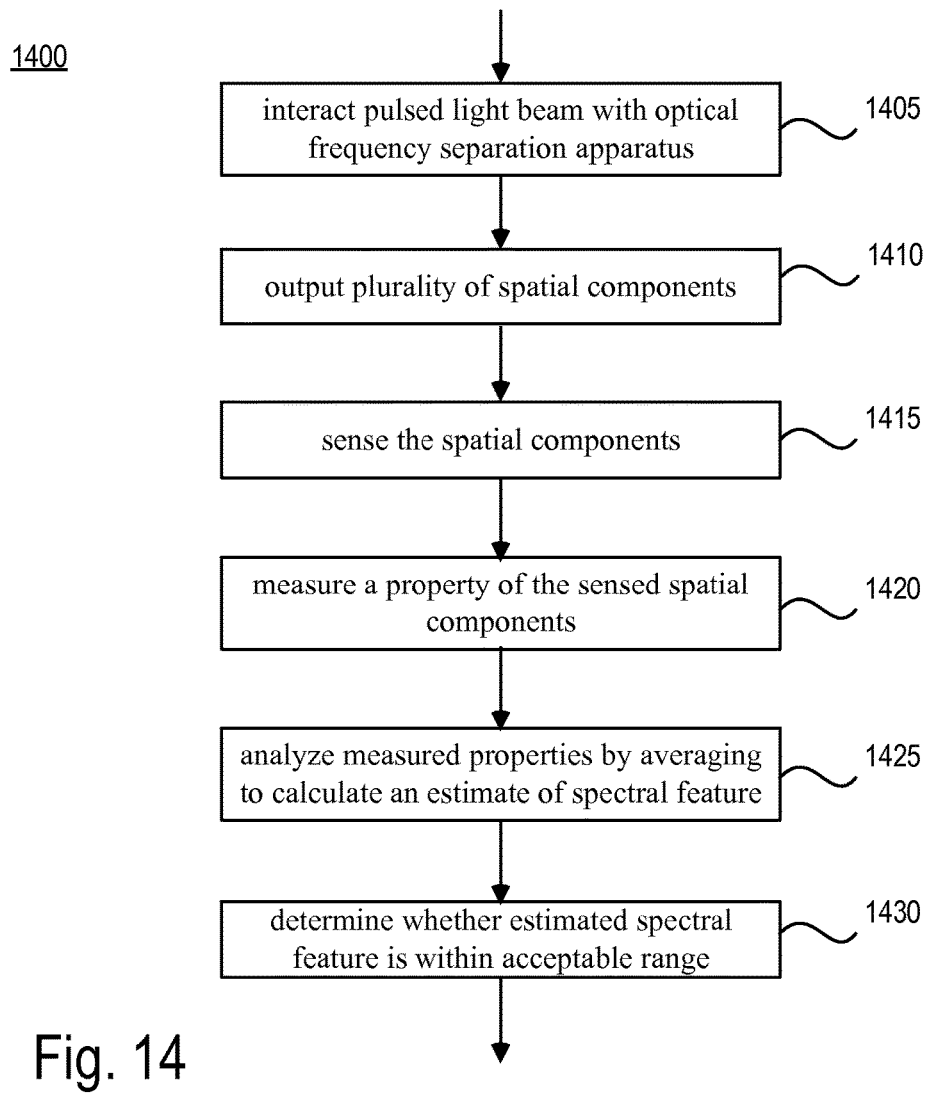
FIG. 14 is a flow chart of a procedure performed by the control system of the photolithography system of FIG. 1.

Referring to FIG. 14, a procedure 1400 is performed by the photolithography system 100 to estimate a spectral feature such as the bandwidth of the pulsed light beam 110. The pulsed light beam 110 is interacted with the optical frequency separation apparatus 171 (1405) to thereby output or produce the plurality of spatial components 174 that correspond to the spectral components of the pulsed light beam 110 (1410). Specifically, the first portion 165 of the pulsed light beam 110 is directed toward the optical frequency separation apparatus 171 after being separated from the pulsed light beam 110 at the beam separation device 160. The first light beam portion 165 is interacted with the optical frequency separation apparatus 171 by directing the first light beam portion 165 though each of the one or more optical frequency separation devices in the apparatus 171.

Thus, for example, if the apparatus 171 includes only a single optical frequency separation device (such as shown in FIGS. 7 and 13), then the first light beam portion 165 is directed through that single optical frequency separation device. If the apparatus 171 includes two or more optical frequency separation devices (such as shown in FIG. 8), then the first light beam portion 165 is divided further into light beam portions, each of which is directed through one of the optical frequency devices of the apparatus 171.

If the apparatus 171 includes an etalon arrangement 1361, such as shown in FIG. 13, then the light beam portion 1365 is directed toward the etalon arrangement 1361 so that the light beam portion 1365 is passed through the etalon 1310. The etalon 1310 acts as an optical interferometer in which the light beam portion 1365 undergoes multiple reflections between the two reflective surfaces (such as the reflective glass or optical flats as shown in FIG. 13). The resulting optical transmission (or reflection) from the etalon 1310 is periodic in wavelength, and it exhibits peaks of large transmission corresponding to resonances of the etalon, such as shown in the resulting fringe pattern 1311. This optical transmission therefore constitutes a plurality of spatial components (the components are spatially separated) that correspond to the spectral (wavelength) components 1374 of the light beam portion 1365 (and therefore the light beam 110).

The plurality of spatial components 174 (such as the spatial components 1374 of FIG. 13) are sensed at each of a plurality of sensing regions 173 placed in the path of the output spatial components 174 (1415). The spatial components 174 can be sensed at each of the sensing regions 173 simultaneously. With reference to FIG. 13, each sensing region 1373 in the plurality 1372 senses the etalon fringe pattern (the spatial components) 1311 and these spatial components 1311 can be used to either recover the entire optical spectrum 1312 or to provide metrics about the optical spectrum 1312.

Figure 15:
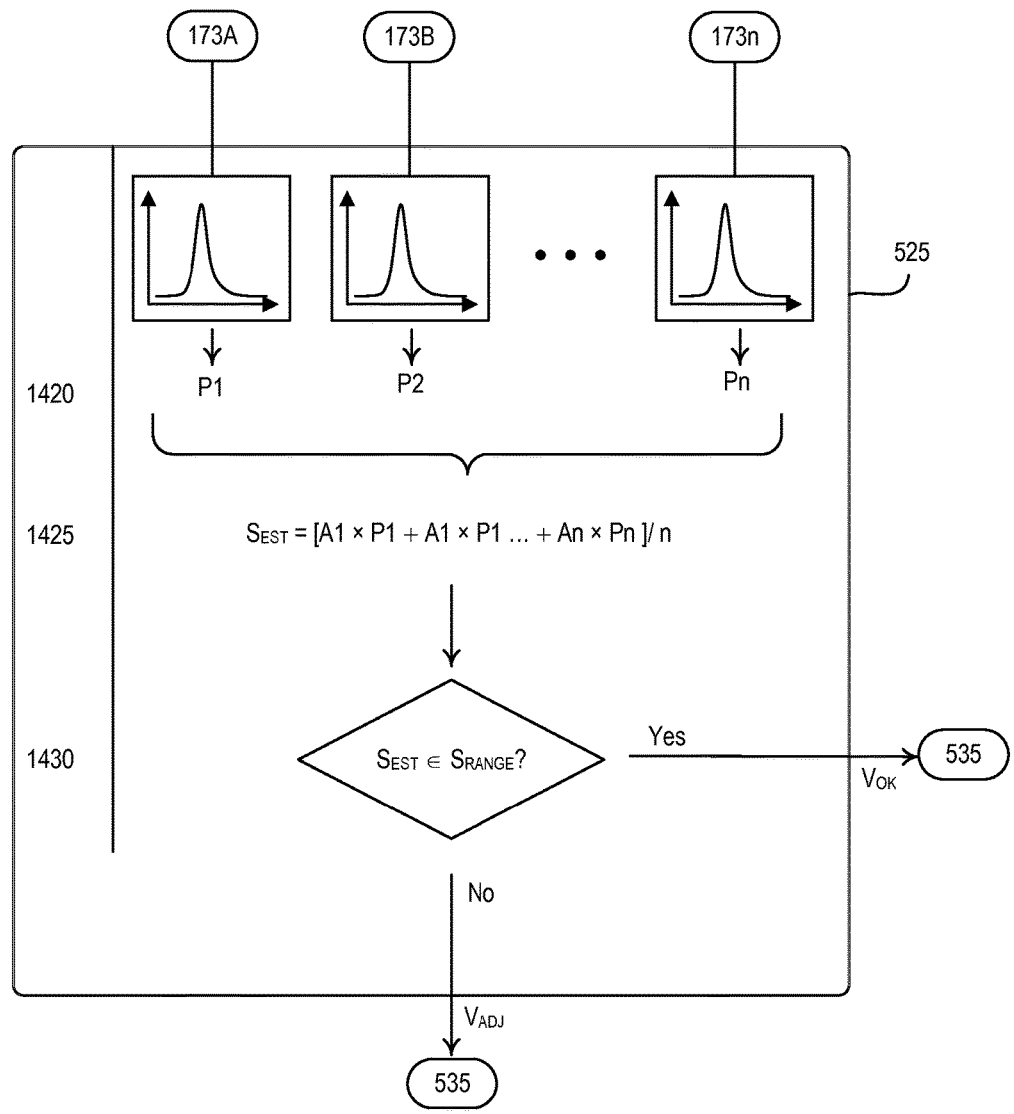
FIG. 15 is a block diagram showing exemplary features of the procedure of FIG. 14.

The control system 185 (by way of the spectral feature analysis module 525) measures, for each of the sensing regions 173, a property P of the sensed spatial components (1420) and thus a set of measured properties {P1, P2, . . . , Pn} is produced, where n is the number of sensing regions 173. The property P can be a scalar quantity (which is fully described by a magnitude (or numerical value) alone or a vector quantity (which is fully described by both a magnitude and a direction. An example of a scalar property P is a metric such as the width of the optical spectrum 1312. In this example, it is possible that the entire shape of the optical spectrum 1312 is not known but the metric is known and this is used to estimate the shape of the optical spectrum 1312. An example of a vector property P is the entire waveform that describes the optical spectrum 1312. In this example, one can calculate any metric from the entire spectrum and the by having the entire spectrum, one can make a more accurate calculation. The sensed spatial components can be measured for a range of one or more pulses of the pulsed light beam 110. FIG. 15 shows an example in which the sensed spatial components are the optical spectrum output from each sensing region 1373.

Using the example of FIG. 13, the control system 185 can measure as the property P the width W of the optical spectrum 1312 output from each of the sensing regions 1373 in the plurality 1372. The width W of each optical spectrum 1312 can provide an estimate of the bandwidth (the spectral feature) of the light beam 110. In some implementations, the width W of each optical spectrum 1312 is determined using a metric such as the FWXM (full width of the spectrum 1312 at a fraction X of the maximum peak intensity). In other implementations, the width W of each optical spectrum 1312 is determined using a metric such as EY (the width of the spectrum that contains a fraction Y of the integrated spectral intensity). Other metrics are suitable for measuring the property of the optical spectrum 1312.

As shown in the example of FIG. 15, the control system 185 uses the same metric for measuring the property P for the sensed spatial components (such as each fringe pattern 1311) that are output from each of the sensing regions 173 (such as each sensing region 1373).

At this point, a set of measured properties {P1, P2, ..., Pn} are produced by the spectral feature analysis module 525, where n is the number of sensing regions 173 (1420). If the property that is measured is the width W, as discussed above, then the set of measured widths {W1, W2, ..., Wn} is produced.

Next, the control system 185 (via the spectral feature analysis module 525) analyzes the measured properties {P1, P2, ..., Pn} (1425). The measured properties are analyzed (1425) by averaging the measured properties to calculate an estimate of the spectral feature of the pulsed light beam. The measured properties {P1, P2, ..., Pn} are averaged by taking a weighted average of the measured properties and the estimate of the spectral feature $S_{EST}$ is calculated:

$S_{EST}$=[A1×P1+A2×P2+ ... An×Pn]/n, where n is the number of sensing regions 173.

As noted above, this average can be adjusted depending on whether the measured properties are scalar in form or vector in form.

It is also possible that the average can be performed directly on the resulting fringe pattern 1311 output from each of the sensing region 173.

The average of the measured properties represents a calculated "central" value that represents the best value of the set of numbers. The average uses the same metric from a plurality of sensing regions having the same response functions without having to solve a set of algebraic equations that use unknown terms. All of the sensing regions are measuring the spectral components from the same source (the pulse of the light beam) and the averaging improves the precision of the measured properties {P1, P2, ..., Pn} by up to $\sqrt{n}$, where n is the number of averaged sensing regions.

The weights A1, A2, ..., An can be values that are selected in advance of the calculation. Or, the weights A1, A2, ..., An can be values that are selected during the operation of the system 100. For example, it is possible that the control system 185 (and the spectral feature analysis module 525) reviews each of the values of the measured properties P and determines which of the measured properties are accurate representations of the spectral feature. The control system 185 can give the most accurate representations a greater weight or can give the ones having the lowest accuracy a low weight (or a weight of 0 to remove them entirely from the calculation). The control system 185 can make the determination of which of the measured properties are accurate representations by using a filter that determines if the calculated measured property is outside of a specified or calculated range (for example, if the calculated measured property is an outlier).

The control system 185 (and specifically the spectral feature analysis module 525) determines whether the estimated spectral feature $S_{EST}$ of the pulsed light beam is within an acceptable range of spectral features (1430). The control system 185 can determine whether the estimated spectral feature $S_{EST}$ is within an acceptable range of spectral features (1430) by comparing the estimated spectral feature $S_{EST}$ with a target range $S_{RANGE}$ of spectral features. Thus, the control system 185 determines whether the estimated spectral feature $S_{EST}$ is found in the target range $S_{RANGE}$ of spectral features.

The spectral feature analysis module 525 outputs information to the decision module 535 based on this determination 1430. Thus, if the spectral feature analysis module 525 determines that the estimated spectral feature $S_{EST}$ of the pulsed light beam is within the acceptable range $S_{RANGE}$ then the spectral feature analysis module 525 can send a signal $V_{OK}$ indicating that no adjustments need to be made to the decision module 535. On the other hand, if the spectral feature analysis module 525 determines that the estimated spectral feature $S_{EST}$ of the pulsed light beam is outside the acceptable range $S_{RANGE}$, then the spectral feature analysis module 525 can send a signal $V_{ADJ}$ to the decision module 535 indicating that an adjustment needs to be made to the light beam 110 by way of modifying one or more of the optical source 105 and the spectral feature selection system 150. The signal $V_{ADJ}$ can also include information (for example, a value) that indicates how much the estimated spectral feature $S_{EST}$ differs from a value within the acceptable range $S_{RANGE}$. The decision module 535 receives this information $V_{OK}$ or $V_{ADJ}$ (along with information from other modules in the control system 185) and determines an appropriate control signal C to send to the light source actuation module 550. The light source actuation module 550 sends a signal $SF_{SIG}$ to the spectral feature selection system 150 to modify the spectral feature of the pulsed light beam 110.

For example, the signal $SF_{SIG}$ can include information that is directed to the control module 452 of the exemplary spectral feature selection system 450, and this signal $SF_{SIG}$ can be analyzed by the control module 452 to determine what sort of signal needs to be output to each of the actuation systems 454, 456, 458 to thereby adjust one or more optical features 460, 462, 464.

Other implementations are within the scope of the following claims. For example, the metrology system 170 can include a grating spectrometer such as the ELIAS echelle spectrometer produced by LTB Lasertechnik Berlin GmbH, of Berlin, Germany. In the grating spectrometer, the light beam 110 is directed toward an echelle grating, which separates or disperses the light according to its wavelength, and the light beam 110 reflected from the grating is directed to a camera such as a charge coupled device camera, which is able to resolve the wavelength distribution of the light beam 110. Such a grating spectrometer can be used for system qualification and in research roles in which very fine details of the spectral shape and the energy distribution, including in-band energies and out-of-band energies, need to be accurately characterized in terms of bandwidth. Typically, grating spectrometers are not practical for onboard, real-time measurement of spectral properties such as the bandwidth in lithography applications.

What is claimed is:

1. A metrology system for measuring a spectral feature of a pulsed light beam, wherein the spectral feature is an aspect of the optical spectrum of the pulsed light beam, the metrology system comprising:
a single etalon in the path of the pulsed light beam and configured to interact with the pulsed light beam and output an interference pattern in the shape of a set of concentric rings that correspond to the spectral components of the pulsed light beam, wherein the single etalon includes a single pair of parallel reflecting surfaces that face each other and are separated by a constant distance;

a plurality of sensors that receive and sense the interference pattern, wherein each sensor of the plurality is arranged to extend across a plurality of the rings along a distinct sensing axis and interacts with only a portion of the interference pattern; and a control system connected to an output of each sensor and configured to:
measure, for each sensor output, a property of the output spatial components from the etalon for one or more pulses;
analyze the measured properties including averaging the measured properties to calculate an estimate of the spectral feature of the pulsed light beam; and
determine whether the estimated spectral feature of the pulsed light beam is within an acceptable range of values of spectral features.

2. The system of claim 1, further comprising a beam splitter in the path of the light beam, wherein the beam splitter:
directs a first percentage of the light beam toward the etalon, and
directs a second percentage of the light beam along the path of the light beam.

3. The system of claim 1, wherein each sensor has the same performance parameters as the other sensors of the plurality.

4. The system of claim 1, wherein the spectral feature is a bandwidth of the pulsed light beam.

5. The system of claim 1, further comprising a spectral feature selection system optically connected to the pulsed light beam, wherein:
the control system is connected to the spectral feature selection system; and
if the control system determines that the estimated spectral feature of the pulsed light beam is outside the acceptable range, then the control system is configured to send an adjustment signal to the spectral feature selection system to modify the spectral feature of the pulsed light beam.

6. The system of claim 1, wherein the range of one or more pulses is a single pulse.

7. The system of claim 1, wherein averaging the measured properties comprises determining which measured property is the most accurate representation of the spectral feature and calculating the spectral feature of the pulsed light beam comprises selecting the measured property that most accurately represents the spectral feature.

8. The system of claim 1, wherein:
the control system is configured to determine which of the measured properties fall inside a target range of values, and
the control system averages the measured properties to calculate an estimate by averaging only those measured properties that fall inside the target range of values.

9. The system of claim 1, wherein averaging the measured properties comprises performing a weighted average of the measured properties and calculating the estimate of the spectral feature of the pulsed light beam comprises selecting the weighted average as the spectral feature estimate.

10. The system of claim 1, wherein each sensor is a portion of a single detector that receives one or more entire spectral components.

11. The system of claim 1, wherein each sensor of the plurality of sensors defines a sensing axis that is perpendicular to a direction of the outputted spatial components.

12. The system of claim 1, wherein each sensor of the plurality of sensors is formed at a distinct location of a single detector placed at the output of the etalon.

13. The system of claim 1, wherein single pair of parallel reflecting surfaces that face each other is formed on a pair of optical flats.

14. The system of claim 1, wherein the single pair of parallel reflecting surfaces that face each other is formed on a single plate.

15. A method for measuring a bandwidth of a pulsed light beam, the method comprising:
dividing the pulsed light beam into a plurality of divided pulsed light beams;
for each divided pulsed light beam, transforming spectral information that includes spectral components of the divided pulsed light beam into spatial information that includes a plurality of spatial components, wherein the plurality of spatial components correspond to the spectral components of the divided pulsed light beam;
directing the plurality of spatial components toward a plurality of sensors;
sensing the plurality of spatial components at each of the sensors;
measuring, at each of the sensors, a property of the spatial components for one or more pulses of the divided pulsed light beam;
analyzing the measured properties including averaging the measured properties to calculate an estimate of the bandwidth of the pulsed light beam; and
determining whether the estimated bandwidth of the pulsed light beam is within an acceptable range of bandwidths.

16. The method of claim 15, wherein sensing the plurality of spatial components at each of the plurality of sensors comprises sensing the plurality of spatial components at each of the plurality of sensors simultaneously for the same pulse of the light beam.

17. The method of claim 15, further comprising, if it is determined that the estimated bandwidth of the pulsed light beam is outside the acceptable range, then modifying the bandwidth of the pulsed light beam.

18. The method of claim 15, wherein averaging the measured properties comprises determining which measured property is the most accurate representation of the bandwidth and calculating the bandwidth of the pulsed light beam comprises selecting the measured property that most accurately represents the bandwidth.

19. The method of claim 15, further comprising determining which of the measured properties fall inside a standard range of values,
wherein averaging the measured properties to calculate an estimate comprises averaging only those measured properties that fall inside the standard range of values.

20. The method of claim 15, wherein averaging the measured properties comprises performing a weighted average of the measured properties and calculating the estimate of the bandwidth of the pulsed light beam comprises selecting the weighted average as the bandwidth estimate.

21. The method of claim 15, wherein measuring, at each of the sensors, the property of the spatial components for one or more pulses of the divided pulsed light beam comprises measuring the property of the output spatial components for each of the sensors using the same measurement technique.

22. An optical system comprising:
an optical source including at least one gain medium that produces a pulsed light beam;
a beam splitter that directs a first portion of the pulsed light beam along a metrology path and directs a second portion of the pulsed light beam along a lithography path,
a metrology system in the metrology path, the metrology system comprising:
   a means for transforming spectral information of the pulsed light beam into an interference pattern in the shape of a set of concentric rings, wherein the transforming means is in the path of the pulsed light beam and is configured to interact with the pulsed light beam;
   a plurality of sensors that receive and sense the interference pattern, wherein each sensor is arranged to interact with only a portion of the interference pattern; and
   a control system connected to an output of each sensor in the plurality, wherein the control system is configured to:
      measure, for each sensor output, a property of the output spatial components for one or more pulses of the pulsed light beam;
      average the measured properties to calculate an estimate of a bandwidth of the pulsed light beam;
      determine whether the estimated bandwidth of the pulsed light beam is within an acceptable range of values of bandwidths; and
   a set of optical elements in the lithography path that receives the pulsed light beam from the optical source and modifies aspects of the pulsed light beam.

23. The system of claim 22, wherein the optical source includes at least one gain medium that produces a pulsed light beam having a wavelength in the deep ultraviolet range.

24. A metrology system for measuring a bandwidth of a pulsed light beam, wherein the bandwidth is an aspect of the optical spectrum of the pulsed light beam, the metrology system comprising:
an arrangement of a plurality of etalons in the path of the pulsed light beam and configured to interact with the pulsed light beam and output a plurality of spatial components that correspond to the spectral components of the pulsed light beam;
a beam splitter that divides the pulsed light beam into a plurality of pulsed light beams, each of the divided pulsed light beams being directed to a respective etalons;
a plurality of sensors that receive and sense the output spatial components; and
a control system connected to an output of each sensor and configured to:
   measure, for each sensor output, a property of the spatial components for one or more pulses;
   analyze the measured properties including averaging the measured properties to estimate a bandwidth of the pulsed light beam; and
   determine whether the estimated bandwidth of the pulsed light beam is within an acceptable range of values of bandwidths.

25. The system of claim 24, wherein each sensor of the plurality of sensors is formed as a distinct detector placed at the output of one of the etalons.

26. The system of claim 24, wherein each etalon has a response function that is the same as the response function of the other etalons.

27. The system of claim 24, further comprising a spectral feature selection system optically coupled to the pulsed light beam, wherein:
the control system is connected to the spectral feature selection system; and
if the control system determines that the estimated bandwidth of the pulsed light beam is outside the acceptable range, then the control system is configured to send an adjustment signal to the spectral feature selection system to modify the bandwidth of the pulsed light beam.

28. The system of claim 24, wherein:
each sensor of the plurality is a portion of a single two-dimensional detector; or
each sensor of the plurality of sensors is formed as a distinct detector placed at the output of one of the etalons in the arrangement.

29. A method for measuring a bandwidth of a pulsed light beam, the method comprising:
directing the light beam through single pair of parallel partially reflecting surfaces that face each other and are separated by a constant distance to thereby transform spectral information that includes spectral components of the pulsed light beam into an interference pattern in the shape of a set of concentric rings that correspond to the spectral components of the pulsed light beam;
directing the plurality of spatial components output from the single pair of parallel reflecting surfaces toward a plurality of sensors, with each sensor arranged to extend across a plurality of rings along a distinct sensing axis and interacting with only a portion of the interference pattern;
sensing the plurality of spatial components at each of the sensors;
measuring, at each of the sensors, a property of the spatial components for one or more pulses of the pulsed light beam;
analyzing the measured properties including averaging the measured properties to calculate an estimate of the bandwidth of the pulsed light beam; and
determining whether the estimated bandwidth of the pulsed light beam is within an acceptable range of bandwidths.

* * * * *